US008080773B2

(12) United States Patent
Tamaoki et al.

(10) Patent No.: US 8,080,773 B2
(45) Date of Patent: Dec. 20, 2011

(54) METHOD AND APPARATUS OF MEASURING BACKWARD LIGHT, AND LASER PROCESSING METHOD

(75) Inventors: Shinobu Tamaoki, Yokohama (JP); Motoki Kakui, Yokohama (JP); Kazuo Nakamae, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 530 days.

(21) Appl. No.: 12/392,331

(22) Filed: Feb. 25, 2009

(65) Prior Publication Data

US 2009/0272877 A1 Nov. 5, 2009

(30) Foreign Application Priority Data

Feb. 25, 2008 (JP) ................................ P2008-043152

(51) Int. Cl.
*G01J 1/32* (2006.01)

(52) U.S. Cl. ................ 250/205; 372/29.011; 372/38.01; 372/38.02

(58) Field of Classification Search .... 250/201.1–201.3, 250/205; 372/13, 14, 29.011, 38.01, 38.02
See application file for complete search history.

(56) References Cited

U.S. PATENT DOCUMENTS

| | | | |
|---|---|---|---|
| 3,329,474 A | 7/1967 | Harris et al. | |
| 3,594,583 A | 7/1971 | Sheldon | |
| 4,548,478 A | 10/1985 | Shirasaki | |
| 5,055,652 A | 10/1991 | Jones et al. | |
| 5,136,598 A | 8/1992 | Weller et al. | |
| 5,384,689 A | 1/1995 | Shen | |
| 5,546,486 A | 8/1996 | Shih et al. | |
| 5,661,829 A | 8/1997 | Zheng | |
| 5,780,806 A | 7/1998 | Ferguson et al. | |
| 6,075,642 A | 6/2000 | Chang | |
| 6,236,146 B1 | 5/2001 | Cramer et al. | |
| 6,278,078 B1 | 8/2001 | Walvoord et al. | |
| 6,335,941 B1 | 1/2002 | Grubb et al. | |
| 6,384,590 B1 * | 5/2002 | Kikuchi et al. | 324/76.36 |
| 6,407,844 B1 | 6/2002 | Yang et al. | |
| 6,742,694 B2 | 6/2004 | Satoh et al. | |
| 6,747,243 B1 | 6/2004 | Reinhardt | |
| 6,888,853 B1 | 5/2005 | Jurgensen | |

(Continued)

FOREIGN PATENT DOCUMENTS

JP 57-100410 A 6/1982

(Continued)

*Primary Examiner* — Francis M Legasse, Jr.
(74) *Attorney, Agent, or Firm* — Venable LLP; Michael A. Sartori; Leigh D. Thelen

(57) ABSTRACT

The present invention relates to a method of measuring backward light, which is constructed for checking, prior to laser processing, backward light that propagates backward through an isolator included in a laser processing apparatus. The present invention also relates to a laser processing method and the like. A laser processing apparatus has an optical head provided with a laser light source part, light guide, and isolator. The optical head has an emitting optical system, irradiation optical system, and light collecting optical system. The method of measuring backward light uses a photodetector to detect, from reference light introduced from a measurement light source into the optical head, the power of an optical component that has passed through the isolator, while changing the position of the measurement light source. The laser processing method performs laser processing by using the laser processing apparatus that has the optical head in which the arrangement of optical components is adjusted beforehand on the basis of the result of detection or result of measurement.

19 Claims, 11 Drawing Sheets

U.S. PATENT DOCUMENTS

| | | |
|---|---|---|
| 7,287,312 B2 | 10/2007 | Yamaguchi |
| 2003/0224581 A1 | 12/2003 | Lutz et al. |
| 2006/0092994 A1 | 5/2006 | Frankel et al. |
| 2006/0204177 A1 | 9/2006 | Singh et al. |
| 2007/0263678 A1 | 11/2007 | Mizuuchi et al. |
| 2008/0013163 A1 | 1/2008 | Leonardo et al. |
| 2008/0053970 A1 | 3/2008 | Nakame |
| 2008/0170291 A1 | 7/2008 | Nakamae et al. |
| 2009/0091839 A1 | 4/2009 | Kakui et al. |

FOREIGN PATENT DOCUMENTS

| | | |
|---|---|---|
| JP | 61-58809 | 12/1986 |
| JP | 03-136201 | 6/1991 |
| JP | 5-224151 | 9/1993 |
| JP | 06-077638 A | 3/1994 |
| JP | 07-249654 | 9/1995 |
| JP | 08-148256 | 6/1996 |
| JP | 09-010976 | 1/1997 |
| JP | 09-054283 A | 2/1997 |
| JP | 11-354916 | 12/1999 |
| JP | 2000-052069 | 2/2000 |
| JP | 2001-068829 | 3/2001 |
| JP | 2003-205376 | 7/2003 |
| JP | 2003-236685 | 8/2003 |
| JP | 2005-347610 | 12/2005 |

\* cited by examiner

METHOD AND APPARATUS OF MEASURING BACKWARD LIGHT, AND LASER PROCESSING METHOD

BACKGROUND OF THE INVENTION

1. Field of the Invention

The present invention relates to a method and apparatus of measuring backward light, which measure and reduce light which is generated by the laser processing and which returns into a laser processing apparatus, and also relates to a laser processing method.

2. Related Background Art

In a light source device (laser processing apparatus) user in laser processing and the like, a laser beam emitted from a laser light source part is guided to an optical head (including an emitting optical system) via a light guide, and then radiated from the optical head to an object surrounded by the laser beam. Generally, a laser diode is used as the laser light source part, but sometimes a fiber laser having an amplifying optical fiber is used. In such a light source device, if reflected light (backward light) that is generated in the object irradiated with the laser beam returns to the laser light source part through the optical head and the light guide, the laser light source part might be damaged. To prevent such damage, it is desired to use an optical isolator for blocking the incidence of the backward light into the laser light source part.

The optical isolator is generally used on a single-lateral-mode beam. Such isolation is described in Japanese Patent Application Laid-Open No. H5-224151 (Document 1) and Examined Japanese Patent Application Publication No. S61-058809 (Document 2). Specifically, an isolator is defined assuming the case in which backward light from a reverse direction (backward beam) enters through the same optical path as an optical path through which a laser beam made incident in a forward direction (forward beam) passes after passing through the isolator. In this case, as described in Document 1 and Document 2, the backward beam is not terminated inside the isolator but generates differences in the emission position and emission angle from a light incident end of the isolator. Therefore, the backward beam is simply not joined to the laser light source generating the forward beam.

As disclosed in Document 1, when a birefringent element of the isolator is in a plate shape, only the emission position of the backward beam emitted from the light incident end of the isolator is changed. However, there is a limit to the shift of the emission position due to a birefringence ratio, and supposed use of a beam having a large mode field diameter might deteriorate the isolation itself.

SUMMARY OF THE INVENTION

The present inventors have examined the above prior art, and as a result, have discovered the following problems.

That is, in an optical head of a laser processing apparatus in which both ends thereof are not joined to each other by an optical fiber, re-focusing forward beams (processing laser beams) in an optical fiber is dangerous due to high power or energy of the forward beams. Furthermore, even when an incident end of an optical head has a delivery optical fiber (light guide), in most cases a laser beam remains as a space optical system and reaches a processed object on an emission end side of the optical head, in order to avoid an insertion failure. If the object has a planar simple structure, even when reflected light is generated, a front direction beam follows the reflected light through the same optical path as an optical path of the forward beam, as shown in FIG. 1A. When an angular separation of the backward beam (backward light) passing through an isolator 33 in the reverse direction is ±α, the backward beam that has passed through the isolator 33 follows an optical path shown in FIG. 1B. Therefore, there is no risk of allowing the backward beam to reenter a delivery optical fiber, the backward beam passing through the isolator 33. However, if the shape of the object has an irregular shape such as a wire or has surface roughness even if it is in the form of a flat plate, or if a hole or groove is formed in the object by the processing even if it is in the form of a smooth flat plate, it is expected that the reflected light (backward beam) from the object follows a random optical path.

In this case, it is highly assumed that the position or angle of the backward beam shown by solid arrows in FIGS. 1B and 1C when the backward beam is made incident on the light emission end of the isolator 33 varies from the position or angle of the forward beam. Therefore, when the backward beam is emitted from the light incident end of the isolator 33, there is a risk that the backward beam is accidentally joined to the delivery optical fiber that is optically connected with the light incident end of the isolator 33. The broken lines in the drawings show the optical paths taken by the forward beam. Particularly, the worst case when the angular separation of the backward beam passing through the isolator 33 is ±α is that the backward beam shifted by an angle of α becomes present (FIG. 1C). Moreover, even if the optical path does not necessarily coincide with this path, there is a risk that some of the beam is joined to the delivery optical fiber, because the beam expands at a certain degree of mode. In order to prevent the backward beam from being joined to the delivery optical fiber as described above, it is necessary to check in advance if the backward beam is joined to the delivery optical fiber.

The present invention has been developed to eliminate the problems described above. It is an object of the present invention to provide a method and apparatus of measuring backward light, which is constructed to be able to control the power of backward light propagated in a reverse direction through an isolator included in a laser processing apparatus, by checking the backward light prior to laser processing, as well as a laser processing method.

In an optical head that configures a laser processing apparatus, together with a light source part emitting a processing laser beam, that has a light incident end for capturing the laser beam from the light source part and a light emission end for outputting the captured laser beam toward an object to be processed, and that is provided with an isolator disposed on an optical path of the laser beam propagating from the light incident end to the light emission end, a method of measuring backward light according to the present invention measures the power of backward light passing through the isolator from the light emission end toward the light incident end, in a direction opposite to a propagation direction of the laser beam, thereby achieving the object described above.

Particularly, in the method of measuring backward light, a measurement light source for emitting light of large numerical aperture is disposed on the light emission end side of the optical head. An emission position of the measurement light source represents a laser irradiation point. Therefore, while changing the emission position of the measurement light source, reference light is emitted from the measurement light source into the optical head via the light emission end of the optical head. The power of the reference light passing through the isolator is measured for each emitting position of the reference light, and the obtained reference light power is compared with a previously-set benchmark power for each emitting position of the reference light. Note that the comparison results may be recorded within the laser processing apparatus in advance.

An apparatus of measuring backward light (the apparatus of measuring backward light according to the present invention) for realizing the method of measuring backward light has the measurement light source, drive means, a photodetector, and a controller. The measurement light source is disposed on the light emission end side of the optical head and emits the light of large numerical aperture, as described above. The drive means changes the emission position of the measurement light source, which serves as the emitting position of the reference light. In other words, the drive means moves the measurement light source so as to change the emission position of the measurement light source relative to the light emission end of the optical head. The photodetector measures the power of the reference light that is emitted from the measurement light source and passes through the isolator in a direction opposite to the propagation direction of the laser beam emitted from the light source part. The controller compares the obtained reference light power with the previously-set benchmark power at each emitting position of the reference light. It is preferred that the controller have memory for recording the comparison results sequentially.

Because the method and apparatus of measuring backward light use the measurement light source emitting light of large numerical aperture and change the emission position of the measurement light source, the backward light that is propagated into the optical head can be recreated. Moreover, the result of measuring the power of the backward light passing through the isolator in the opposite direction out of the reference light outputted from the measurement light source is compared with the benchmark power that is set beforehand for each emitting position of the reference light, whereby the backward light passing through the isolator in the opposite direction can be evaluated appropriately.

In accordance with the apparatus of measuring backward light according to the present invention, the optical head may further have backward light adjusting means for adjusting the arrangement of a plurality of optical components including the isolator, the optical components being disposed on a propagation path of the laser beam emitted from the light source part to propagate from the light incident end to the light emission end. In this case, when one of the powers of the reference light obtained at the emitting positions of the reference light is greater than the benchmark power, the controller adjusts at least one of the optical components so as to reduce the powers of the reference light to be obtained at all emitting positions of the reference light, to the benchmark power or lower. In accordance with such a configuration, because the backward light adjusting means adjusts the arrangement of the optical components prior to laser processing (to the benchmark power or lower), the high-power backward light is prevented from entering the light source part of the laser beam.

In addition, the controller can record the arrangement of the optical components in the memory for each emitting position of the reference light, the arrangement being obtained after the backward light adjusting operation is performed for each emitting position of the reference light. Because the control can be so performed that the arrangement of the optical components of the optical head is adjusted for each laser irradiation position (corresponding to each emitting position of the reference light) when the actual laser processing is conducted, an increase of the backward light can be inhibited even when the laser irradiation positions are changed during the laser processing.

Note that the optical components may include the isolator and a collimator disposed between the isolator and the light incident end of the optical head. In this configuration, the backward light adjusting means adjusts the arrangement of at least one of the isolator and the collimator. In addition to the isolator and collimator, the optical components may further include a restricting member, disposed at least either between the isolator and the collimator or between the isolator and the light emission end of the optical head, for restricting a laser beam transmission region. In this configuration, the backward light adjusting means adjusts the arrangement of at least one of the isolator, the collimator, and the restricting member.

In any one of the configurations of the optical head described above, the backward light adjusting means can further reduce the backward light power. Consequently, the backward light reduction effect can be further enhanced.

The optical head has an emitting optical system disposed between the light incident end and the light emission end and having the isolator, an irradiation optical system disposed between the emitting optical system and the light emission end and for radiating a laser beam emitted from the emitting optical system onto the object to be processed, and an fθ lens disposed between the irradiation optical system and the light emission end. The measurement light source can emit the reference light toward the fθ lens via the light emission end of the optical head, with a predetermined angle in relation to an optical axis of the fθ lens.

A laser processing method according to the present invention radiates a laser beam onto the object to be processed, by using the laser processing apparatus that has the optical head evaluated in any one of the aspects of the above-described method of measuring backward light.

For example, a first aspect prepares a laser processing apparatus which has the optical head in which the power of the reference light from each emitting position of the reference light contained in a laser irradiation range of the object to be processed is measured, and records the results of the comparison between the measured power of the reference light and the benchmark power, for each emitting position of the reference light. In the first aspect, the laser beam from the prepared laser processing apparatus is radiated onto the laser irradiation range of the object to be processed, while sequentially avoiding the emitting positions of the reference light at which the measured power of the reference light exceeds the benchmark power.

A second aspect prepares a laser processing apparatus which has the optical head in which the arrangement of at least one of the plurality of optical components is adjusted so that the power of the reference light is reduced to the benchmark power or lower in all emitting positions of the reference light, on the basis of the results of the measurement of the power of the reference light from each emitting position of the reference light contained in the laser irradiation range of the object to be processed. In the second aspect the laser beam from the prepared laser processing apparatus is radiated onto the laser irradiation range of the object to be processed.

A third aspect prepares a laser processing apparatus which has the optical head in which the power of the reference light from each emitting position of the reference light contained in a laser irradiation range of the object to be processed is measured. In the third aspect the laser beam from the prepared laser processing apparatus is radiated onto the laser irradiation range of the object to be processed, while recreating the arrangement of the optical components contained in the optical head is recreated, the arrangement being recorded at each emitting position of the reference light.

DESCRIPTION OF THE PREFERRED EMBODIMENTS

Figure 1A:
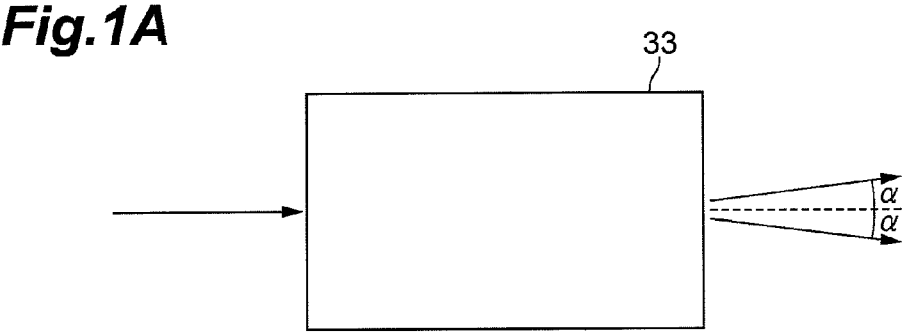
FIGS. 1A to 1C are each a diagram for explaining an emission direction of incident light from an opposite direction (an opposite direction of a propagation direction of a processing laser beam) to an isolator.

In the following, embodiments of the method and apparatus of measuring backward light and the laser processing method according to the present invention are explained hereinafter in detail with reference to FIGS. 1A to 1C, 2 to 4, 5A, 5B and 6 to 11. In the description of the drawings, identical or corresponding components are designated by the same reference numerals, and overlapping description is omitted.

First Embodiment

Figure 2:
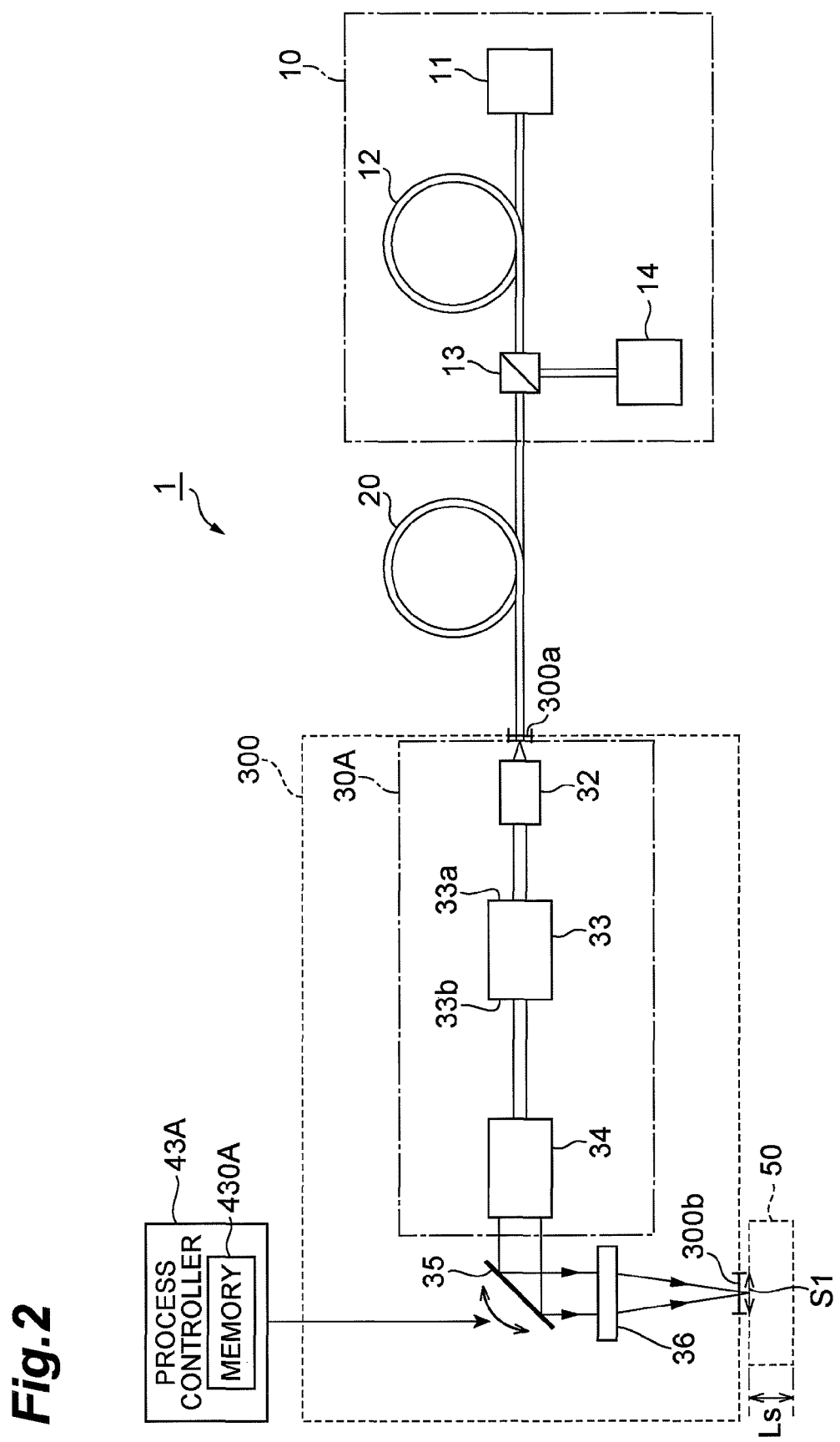
FIG. 2 is a diagram showing a configuration of a laser processing apparatus which realizes a laser processing method according to a first embodiment and to which an optical head evaluated by a method and apparatus of measuring backward light according to the first embodiment is applied.

FIG. 2 is a diagram showing a configuration of a laser processing apparatus which realizes a laser processing method according to a first embodiment and to which an optical head evaluated by a method and apparatus of measuring backward light according to the first embodiment is applied. A laser processing apparatus 1 shown in FIG. 2 has a laser light source part 10, light guide 20, and optical head 300. The optical head 300 has a light incident end 300a for capturing a laser beam from the light guide 20, and a light emission end 300b for radiating the laser beam on an object 50 with a thickness of Ls. The optical head 300 further has an emitting optical system 30A, irradiation optical system (galvanometer mirror or mirrors) 35, and light collecting optical system (fθ lens) 36. The light collecting optical system 36 is a combination of a plurality of lenses and configured as a black box because the lenses are various in shape and characteristics, depending on the application. The fθ lens used in the laser processing apparatus 1 is characterized in radiating the laser beam from the irradiation optical system 35 on the object 50 substantially vertically. Note that the laser processing apparatus 1 has a process controller 43A. The process controller 43A adjusts the angle of the irradiation optical system 35, thereby changing a laser irradiation position of the object 50 along the arrow S1. The process controller 43A may constitutes a part of the backward light measurement apparatus of the first embodiment shown in FIG. 3, and has memory 430A for recording an evaluation result and the like of the backward light measurement apparatus of the first embodiment.

Figure 3:
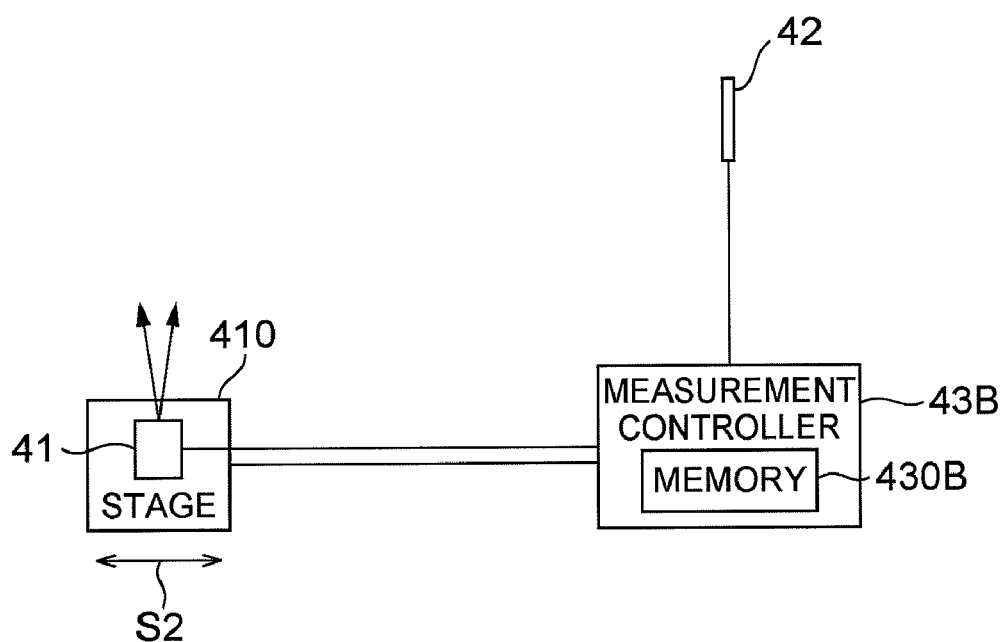
FIG. 3 is a diagram showing a configuration of the first embodiment of the apparatus of measuring backward light according to the present invention.

The backward light measurement apparatus shown in FIG. 3 for realizing the method of measuring backward light according to the first embodiment has a measurement light source 41, drive means (stage) 410 for moving the measurement light source 41 along the arrow S2, relative to the light emission end 300b of the optical head 300, photodetector 42, and the measurement controller 43B having the memory 430B. The measurement results are stored into the memories 430A and 430B.

In the laser processing apparatus 1, the laser light source part 10 has a seed laser 11, amplifying optical fiber 12, optical coupler 13, and excitation light source 14. The amplifying optical fiber 12 is a silica-based fiber in which Yb element is added to a core region. Excitation light that is outputted from the excitation light source 14 is supplied to the amplifying optical fiber 12 via the optical coupler 13, and seed light that is outputted form the seed light source 11 is supplied to an end of the amplifying optical fiber 12. In the amplifying optical fiber 12, the Yb element is excited by the supply of the excitation light, thereby amplifying the seed light. The amplified seed light is emitted to the other end of the amplifying optical fiber 12. The laser light source part 10 emits the light amplified by the amplifying optical fiber 12 to the outside via the optical coupler 13, as a processing laser beam.

The light guide 20 has a delivery optical fiber provided between the laser light source part 10 and the emitting optical system 30A. The light guide 20 functions to transmit the laser beam emitted from the laser light source part 10 and guide the laser beam to the emitting optical system 30A. Note that an optical connector may be provided between the light guide 20 and the emitting optical system 30A.

The emitting optical system 30A has a collimator 32, isolator 33, and beam expander 34. The collimator 32 collimates the laser beam outputted from the light guide 20 and outputs thus obtained collimated light to the isolator 33.

The isolator 33, a polarization independent isolator, has a birefringent element functioning to separate polarized waves at a first end 33a and combine the polarized waves at a second end 33b. The isolator 33 inputs, from the first end 33a, the collimated light obtained from the collimator 32, and outputs the collimated light from the second end 33b to the beam expander 34.

The beam expander 34 expands the beam diameter of the laser beam outputted from the second end 33b of the isolator 33 and then outputs the resultant laser beam to the irradiation optical system 35.

The irradiation optical system 35 reflects the laser beam outputted from the beam expander 34, to the light collecting optical system 36. The irradiation optical system 35 can change the reflection direction of the laser beam by means of the process controller 43A. The irradiation optical system 35 functions to change the reflection direction of the laser beam by being subjected to angular control by the process controller 43A, such that the irradiation position of the reflected laser beam scans the object 50. The irradiation optical system 35 preferably includes a galvanometer mirror. The irradiation optical system 35 shown in FIG. 2 can rotate around a reflecting point of a principal ray of the laser beam outputted from the beam expander 34, thereby changing the output direction of the principal ray reflecting on the irradiation optical system 35. The irradiation optical system 35 has two rotation axes perpendicular to each other. Note that the irradiation optical system 35 is disposed such that the reflecting point of the principal ray outputted from the beam expander 34 is brought to a front focal point position of the light collecting optical system 36.

The light collecting optical system 36 includes the fθ lens for focusing the laser beam outputted by the irradiation optical system 35, onto the object 50. The front focal point position of the light collecting optical system 36 is disposed on the reflecting point of the principal ray in the irradiation optical system 35.

When the actual laser processing is conducted, the object 50 is disposed in a focal position of the laser beam focused by the light collecting optical system 36. However, in the case of measuring the backward light within the optical head 300 beforehand by means of the backward light measurement apparatus shown in FIG. 3, the measurement light source 41 that emits the reference light of large numerical aperture is disposed at the position of the object 50, and the stage 410 moves the measurement light source 41 along the arrow S2.

As described above, the backward light measurement apparatus according to the first embodiment shown in FIG. 3 has the measurement light source 41 emitting the reference light, the photodetector 42 detecting the reference light emitted from the measurement light source 41, and measurement controller 43B controlling the position of the measurement light source 41 and the intensity and the like of the light detected by the photodetector 42. Furthermore, the measurement controller 43B is provided with a memory 430B for recording a result of the backward light measurement performed in the optical head 300. The contents of the memory 430B correspond to those of the memory 430A, and information in the memory 430A is used for adjusting the angle of the irradiation optical system 35 in the laser processing apparatus 1 shown in FIG. 2.

Figure 4:
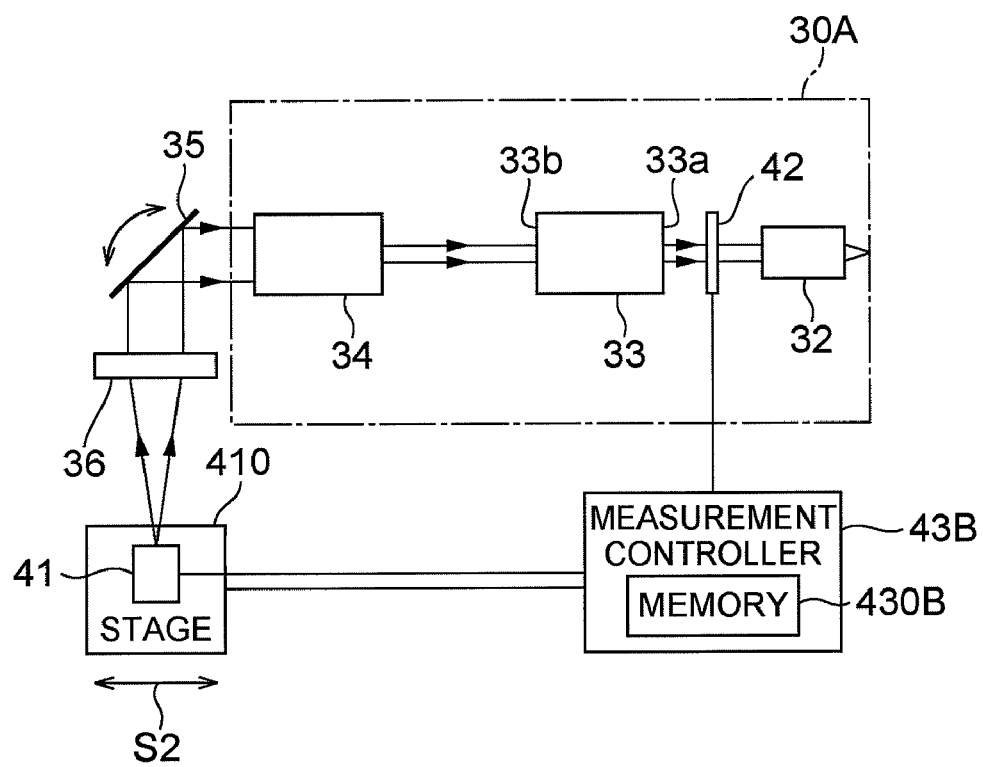
FIG. 4 is a diagram for explaining the first embodiment of the method of measuring backward light according to the present invention.

FIG. 4 is a diagram for explaining the first embodiment of the method of measuring backward light according to the present invention. Specifically, the diagram shows a configuration in which the optical head 300 of the laser processing apparatus 1 shown in FIG. 2 is evaluated by the backward light measurement apparatus shown in FIG. 3.

The measurement light source 41 mounted on the stage 410 emits the reference light to the direction of the light collecting optical system 36. The measurement light source 41 includes a rear focal point of the light collecting optical system 36 and is mounted on a plane perpendicular to the optical axis of the light collecting optical system 36. In other words, the measurement light source 41 is mounted in a range where the laser beam outputted from the laser light source part 10 can be radiated via the light guide 20, emitting optical system 30, irradiation optical system 35, and light collecting optical system 36. Note that the measurement light source 41 is not used in laser processing in which the laser beam from the laser light source part 10 is radiated onto the object 50. Because the measurement light source 41 is an apparatus provided in a place where the object 50 is disposed, it is removed as shown in FIG. 2, in order to radiate the laser beam from the laser light source part 10 onto the object 50. The intensity of the reference light emitted from the measurement light source 41 may be in the range that does not damage the laser light source part 10 and is preferably, for example, 100 mW or lower. In addition, the wavelength of the reference light is preferably in the range of 1000 to 1100 nm, and not only multimode light with a wavelength of 1060 nm but also a noncoherent light source such as an ASE (Amplified Spontaneous Emission) light source may be used.

The photodetector 42 is provided between the collimator 32 and isolator 33 of the emitting optical system 30A. The photodetector 42 preferably has measuring equipment such as a power meter, and a light-receiving function such as a photodiode. Because the photodetector 42 is not used in the actual laser processing in which the laser beam from the laser light source part 10 is radiated onto the object 50, the photodetector 42 is removed from the emitting optical system 30A as shown in FIG. 2, when the actual laser processing is performed.

The measurement controller 43B is electrically connected with the measurement light source 41 and the photodetector 42, and records the position of the measurement light source 41, the emission direction of the reference light, and the light intensity detected by the photodetector 42, in the memories 430A and 430B. The stage 410 for changing the emission position of the emission light source 41 is controlled by the measurement controller 43B. The connection between the measurement controller 43B and the measurement light source 41 or photodetector 42 can be realized by means of serial communication, GPIB (General Purpose Interface Bus) communication, or the like.

As described above, the laser processing apparatus 1 having the optical head 300 in which the backward light is evaluated by the apparatus and method of measuring backward light according to the first embodiment can be configured.

Figure 1B:
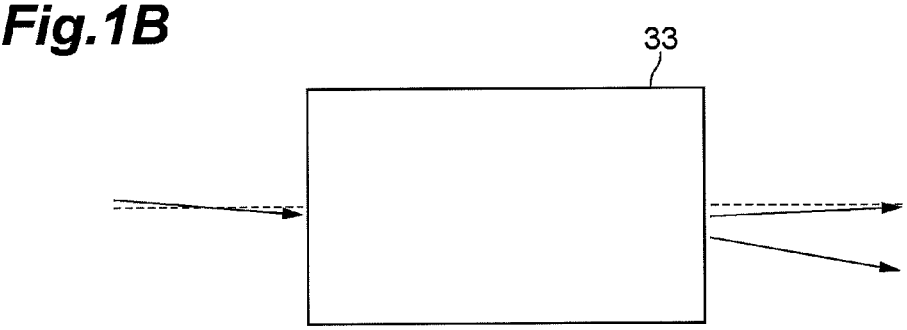
Figure 1C:
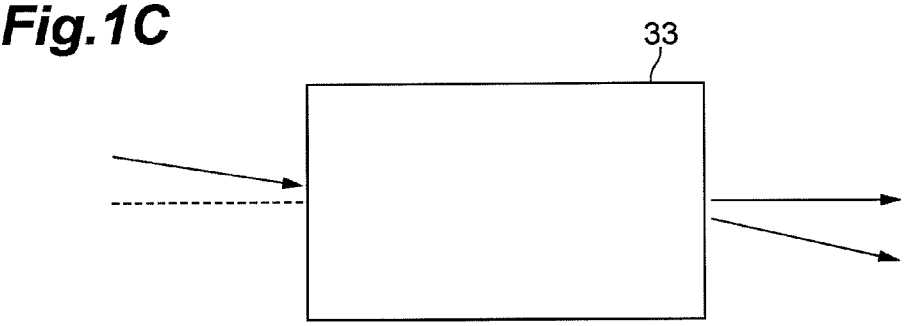

Next, the method of measuring backward light according to the first embodiment is described in detail with reference to FIGS. 2 to 6. Note that FIGS. 1A to 1C are also referred to if needed.

Figure 5A:
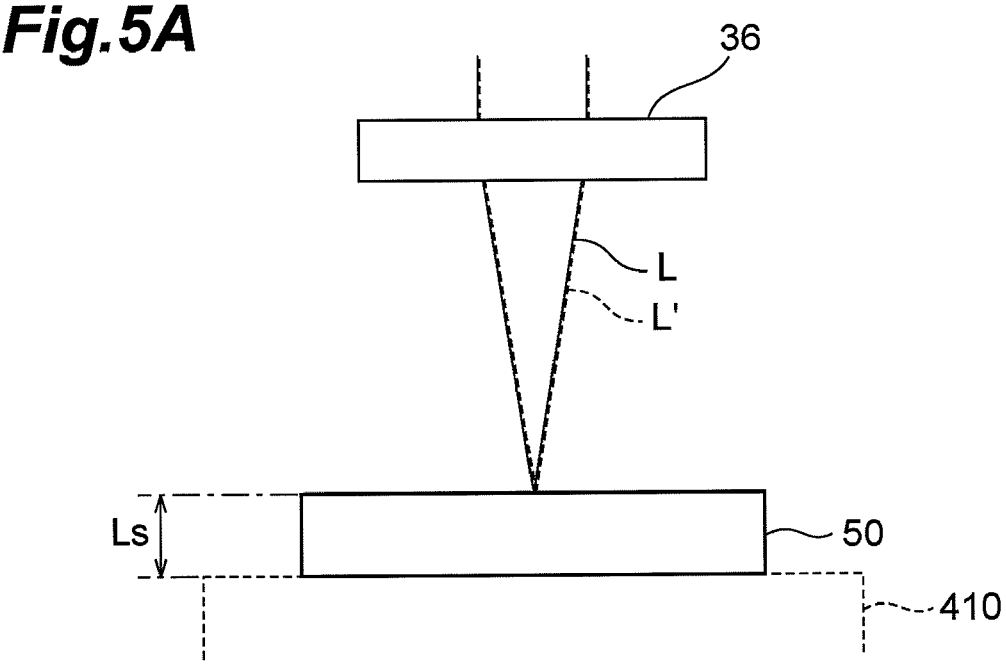
FIGS. 5A and 5B are each a diagram for explaining an example of a behavior of backward light obtained when radiating a laser beam onto an object to be processed by using the laser processing apparatus shown in FIG. 2.
Figure 5B:
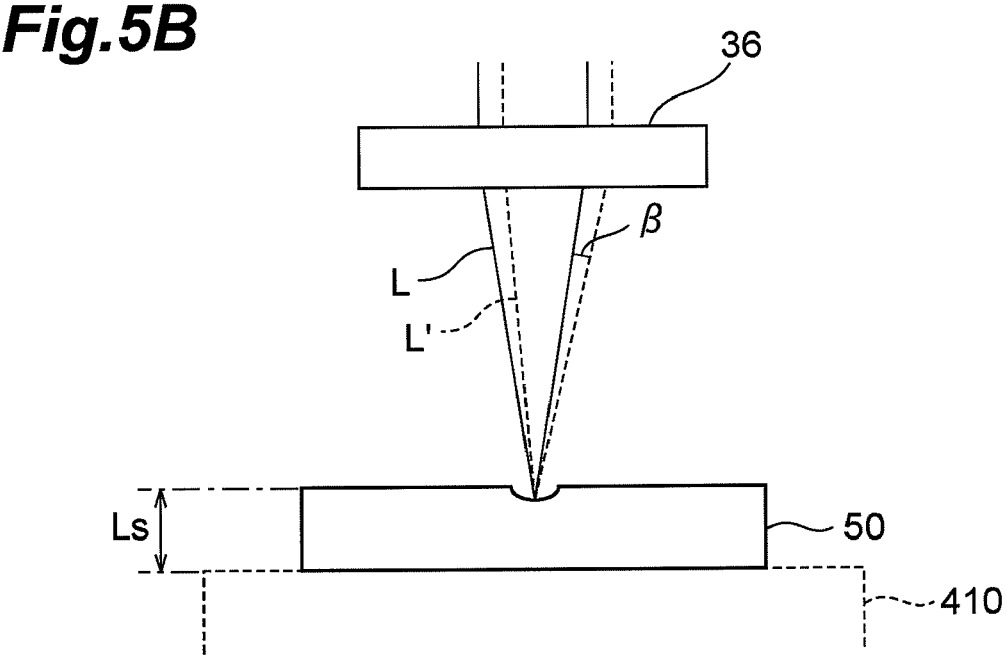

First, backward light obtained when the object 50 is irradiated with a laser beam in the laser processing apparatus 1 shown in FIG. 2 is described. FIGS. 5A and 5B are each a diagram showing an example of emission of backward light obtained when radiating a laser beam onto the object 50 by using the laser processing apparatus 1 shown in FIG. 2. As shown in FIG. 5A, when a laser beam L focused by the light collecting optical system 36 is radiated onto the flat-surface object 50 that is perpendicular to the direction of the optical axis of the light collecting optical system 36, reflected light (backward light) L' follows an optical path of the incident laser beam L and enters the light collecting optical system 36. The reflected light L' that is made incident on the light collecting optical system 36 follows the optical path of the laser beam L and then reaches the isolator 33 via the irradiation optical system 35 and the beam expander 34. At this moment, the reflected light L' passes through the isolator 33 along the optical path shown in FIG. 1A and is emitted from the first end 33a of the isolator 33 at a spread angle of ±θ. Therefore, when laser processing is performed on the object 50 having the flat surface as shown in FIG. 5A, the laser light source part 10 can be prevented from being damaged, without making the reflected light L' incident on the collimator 32 or making light incident on the light guide 20 from the collimator 32.

As shown in FIG. 5B, on the other hand, when the surface of the object 50 irradiated with the laser beam has a complicated shape, or when the surface of the object 50 is not perpendicular to the direction of the optical axis of the light collecting optical system 36, the laser beam L focused by the light collecting optical system 36 is reflected on a reflection surface of the object 50 in a direction different from the input direction of the laser beam L. specifically, the reflected light (backward light) L' travels along an optical path that is different from that of the laser beam L by an angle of β, enters the light collecting optical system 36, and thereafter reaches the irradiation optical system 35. Because the reflection surface of the irradiation optical system 35 is made large to some extent due to the function of scanning the irradiation position of the laser beam, the reflection surface also reflects light that is reflected in a direction different from the input direction of the laser beam. Therefore, the reflected light L' reflecting from the light collecting optical system 36 travels along an optical path that is different from the one obtained when inputting the laser beam L, and reaches the isolator 33 via the irradiation optical system 35 and the beam expander 34. Therefore, when laser processing is performed on the object 50 having the complicated surface (FIG. 5B), the reflected light L' might follow the optical path shown in FIG. 1B or 1C to reach the isolator 33, and damage the laser light source part 10.

For light propagating a specific optical path, the isolator generally functions to allow the passage of a forward beam and blocks a backward beam. However, there is a limit to this function and it might allows the passage of the backward direction light straying from the specific optical path, i.e., the backward beam that obliquely enter a light emission end surface of the isolator 33 as shown in FIG. 1B or 1C.

Therefore, the backward light measurement apparatus shown in FIGS. 3 and 4 needs to measure the backward light by using the reference light emitted from the measurement light source 41, assuming that the laser beam is reflected in a direction different from the incident direction on the object 50 having the complicated surface as shown in FIG. 5B.

Figure 6:
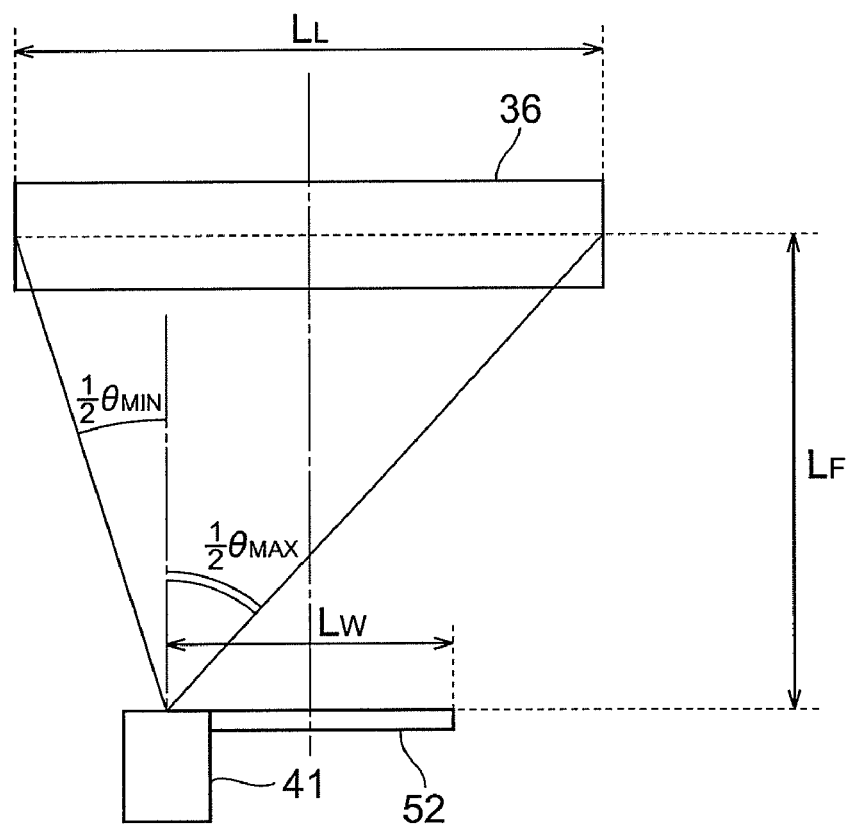
FIG. 6 is a diagram for explaining the behavior of the backward light obtained when the laser beam is focused on an end of a processable region by using the laser processing apparatus shown in FIG. 2.

FIG. 6 is a diagram for explaining the behavior of the backward light obtained when the laser beam is focused on an end of the processable region 52 by using the laser processing apparatus 1 shown in FIG. 2. The processable region 52 is a region in which the object 50 can be processed by the laser beam emitted from the laser light source part 10. The processable region 52 is determined by the characteristics of the light collecting optical system 36 and the direction of the principal ray reflected by the rotation of the irradiation optical system 35. In a case in which the reflection direction is changed by rotating the irradiation optical system 35 shown in FIG. 2 around the reflection ray by means of the two rotation axes, the focal points of the laser beam reflected by the irradiation optical system 35 and then focused by the light collecting optical system 36 forms the processable region 52 into a quadrangle. A processable region width $L_W$ represents the width of the processable region 52. The processable region width $L_W$ is defined by the longest side out of the sides forming the quadrangle. In a case in which the structure of the irradiation optical system 35 is different from above and the processable region 52 has a circular shape, the processable region width $L_W$ is defined by the maximum diameter of the circular shape. In addition, in FIG. 6, $L_L$ represents the diameter of the light collecting optical system 36 and $L_F$ a focal distance of the light collecting optical system 36.

Here, backward light (backward beam) that is likely to reach the laser light source part 10 is considered as the backward light with reference to FIG. 6. The backward light that is likely to reach the laser light source part 10 is generated by reflecting on the surface of the object to be processed, when focusing the laser beam outputted from the laser light source part 10 onto the surface of the object to be processed. Specifically, the backward light is reflected on the surface of the object 50 that is positioned in the focal points resulted when focusing the laser beam by means of the light collecting optical system 36, and then enters the light collecting optical system 36. The measurement light source 41 is applied as the source of generation of this backward light. When the reference light is emitted from the measurement light source 41 and radiated to the light collecting optical system 36, the backward light can be recreated by placing the measurement light source 41 on the processable region 52.

On the other hand, the backward light entering the light collecting optical system 36 is not only parallel to the direction of the optical axis of the light collecting optical system 36, but also can have a certain angle, as shown in FIG. 5B. When the laser beam is reflected at the position of the measurement light source 41 provided at the end of the processable region 52 as shown in FIG. 6, the incidence angle of the backward light reaching the light collecting system 36 becomes maximum when the backward light reaches the end of the light collecting optical system 36 that is opposite to the position of reflection of the laser beam in relation to the direction of the optical axis of the light collecting optical system 36. Therefore, in the case of recreating this backward light by means of the reference light, when the spread angle (numerical aperture) of the reference light emitted from the measurement light source 41 is θ in a state in which the emission direction of the measurement light source 41 is disposed parallel to the optical axis of the light collecting optical system 36, this spread angle θ needs to be an angle represented by $θ_{MAX}/2$ as shown in FIG. 6, that is, an angle at which the reference light can be radiated in a direction in which the incidence angle described above becomes the maximum. Therefore, the measurement light source 41 preferably emits the reference light at the spread angle θ to satisfy the following inequation (1) expressed using the processable region width $L_W$, the diameter $L_L$ of the light collecting optical system 36 and the focal distance $L_F$ of the light collecting optical system 36.

$$L_F \times θ \geq L_L + L_W \quad (1)$$

For example, in a case in which the diameter $L_L$ of the light collecting optical system 36 is 120 mm, the focal distance $L_F$ of the light collecting optical system 36 160 mm, the shape of the processable region 52 a square shape, and the width $L_W$ of the square processable region 89 mm, the length of each side of the processable region being 63 mm, the spread angle θ of the reference light emitted from the measurement light source 41 is preferably at least 64.26° in the above inequation (1). The backward light that is likely to be generated when irradiating the processable region 52 with the laser beam outputted from the laser light source part 10, by moving the measurement light source 41 having the spread angle θ satisfying the above inequation (1) within the processable region 52 by using the stage 410. Note that when the spread angle θ of the reference light emitted from the measurement light source 41 is smaller than the above inequation (1), the similar effect can be achieved by changing the direction of the reference light outputted from the measurement light source 41 by using the stage 410, so as to satisfy the spread angle θ shown in the above inequation (1).

In a case in which the thickness $L_S$ of the object 50, shown in FIG. 2 and the like, is at least 1 mm and the laser beam is radiated at a position located before the focal distance $L_F$ of the light collecting optical system 36 by the thickness $L_S$, the affect of the thickness $L_S$ cannot be ignored. Therefore, it is preferred that the spread angle θ of the reference light emitted from the measurement light source 41 satisfy the following inequation (2).

$$(L_F-L_S) \times \theta \geq L_L + L_W \quad (2)$$

The photodetector 42 detects the reference light that is emitted from the measurement light source 41 and thereafter travels through the light collecting optical system 36, irradiation optical system 35, beam expander 34, and isolator 33. The reference light reaching the photodetector 42 includes light that is likely to damage the laser light source part 10 after propagating within the light guide 20, and light that is unlikely to damage the laser light source part 10. In other words, the photodetector 42 detects light that is emitted from the measurement light source 41 in a direction parallel to the direction of the optical axis of the light collecting optical system 36 and travels backward on an optical path along which the processing laser beam from the laser light source part 10 follows, that is, an optical component that enters the isolator 33 from the optical path coinciding with the optical path of the forward beam shown in FIG. 1A and has a low risk of entering a delivery fiber.

The measurement controller 43B evaluates the backward light that is obtained when the laser beam is radiated in the focal position where the measurement light source 41 is disposed, on the basis of the intensity of the reference light measured by the photodetector 42 and the position of the measurement light source 41 (emission position of the measurement light source 41) emitting the reference light. Specifically, the measurement controller 43B determines whether the light detected by the photodetector 42 is likely to damage the laser light source part 10. For example, the power of light that is likely to damage the laser light source part 10 when entering the light guide 20 is set as the benchmark power beforehand. When the value obtained by subtracting the benchmark power from the power of the reference light detected by the photodetector 42 is a positive value, it can be determined that the backward light reaching the photodetector 42 includes an optical component that is highly likely to damage the laser light source part 10 when entering the light guide 20. Specifically, when the intensity of the reference light detected by the photodetector 42 is at least approximately 50 dB, the optical component might damage the laser light source part 10. This determination may be made by a human or performed automatically after storing the benchmark power in the memory 430B of the measurement controller 43B beforehand.

The measurement controller 43B collects information on each emitting position of the reference light as described above, and determines the region from the processable region 52 in which the laser light source part 10 is likely to be damaged by the backward light. In the laser processing method according to the first embodiment, the laser beam is radiated to perform laser processing on the object 50 in the determined region in which the laser light source part 10 is likely to be damaged, i.e., the region other than the region where the backward light having a power higher than the benchmark power is detected. In this manner, the risk that the laser light source part 10 is damaged by the backward light generated at the time of laser beam radiation can be reduced.

As described above, when the actual laser processing is conducted (the laser beam is radiated from the laser light source part 10 to perform laser processing), the laser light source part 10 can be prevented from being damaged by the backward light of the laser beam, by using the photodetector 42 to measure beforehand the risk of the generation of the backward light in the laser processing apparatus 1 and the reference light emitted from the measurement light source 41.

Second Embodiment

Figure 7:
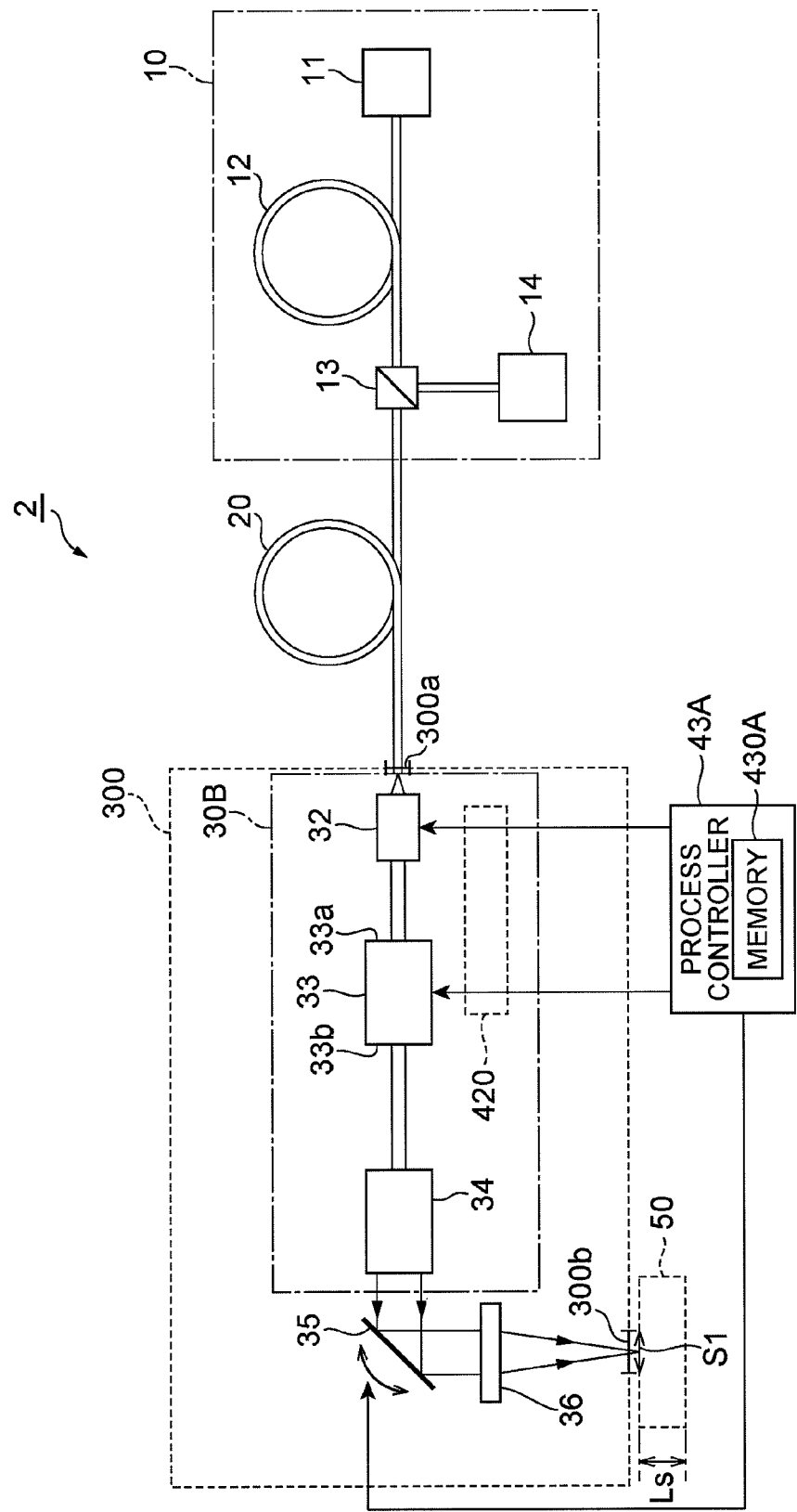
FIG. 7 is a diagram showing a configuration of a laser processing apparatus which realizes a laser processing method according to a second embodiment and to which an optical head evaluated by a method and apparatus of measuring backward light according to the second embodiment is applied.

FIG. 7 is a diagram showing a configuration of a laser processing apparatus which realizes a laser processing method according to a second embodiment and to which an optical head evaluated by a method and apparatus of measuring backward light according to the second embodiment is applied. A laser processing apparatus 2 shown in FIG. 7 has a laser light source part 10, light guide 20, and optical head 300. The optical head 300 has a light incident end 300a for capturing a laser beam from the light guide 20, and a light emission end 300b for radiating the laser beam on an object 50. The optical head 300 further has an emitting optical system 30B, irradiation optical system (galvanometer mirror) 35, and light collecting optical system (fθ lens) 36. The light collecting optical system 36 is a combination of a plurality of lenses and configured as a black box because the lenses are various in shape and characteristics, depending on the application. The fθ lens used in the laser processing apparatus 2 is characterized in radiating the laser beam from the irradiation optical system 35 on the object 50 substantially vertically. Note that the laser processing apparatus 2 has a process controller 43A. The process controller 43A adjusts the angle of the irradiation optical system 35, thereby changing a laser irradiation position of the object 50 along the arrow S1. The process controller 43A may constitutes a part of the backward light measurement apparatus of the second embodiment shown in FIG. 8, and has memory 430A for recording an evaluation result and the like of the backward light measurement apparatus of the second embodiment.

Figure 8:
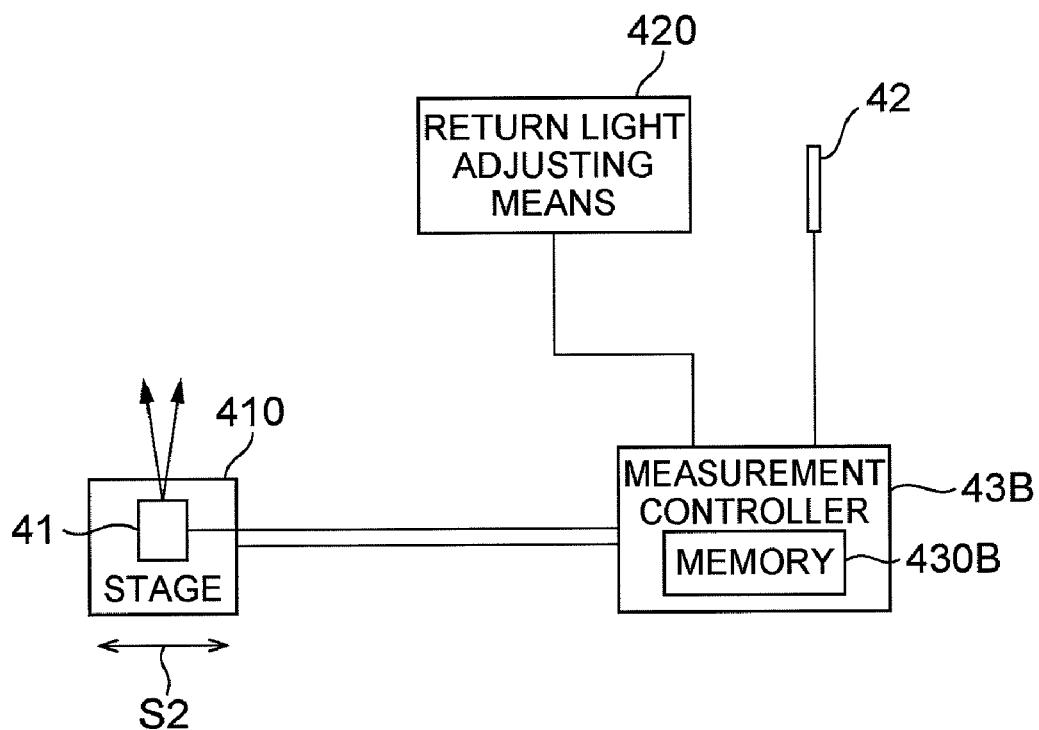
FIG. 8 is a diagram showing a configuration of the second embodiment of the apparatus of measuring backward light according to the present invention.

The backward light measurement apparatus shown in FIG. 8 for realizing the method of measuring backward light according to the second embodiment has a measurement light source 41, drive means (stage) 410 for moving the measurement light source 41 along the arrow S2, relative to the light emission end 300b of the optical head 300, photodetector 42, the measurement controller 43B having the memory 430B, and backward light adjusting means 420. The information stored in the memory 430B corresponds to that in the memory 430A. Unlike the laser processing apparatus 1 shown in FIG. 2, in the laser processing apparatus 2 shown in FIG. 7 the process controller 43A change the positions of the collimate 32 and the isolator 33 included the emitting optical system 30B, on the basis of the information in the memory 430A. On the other hand, in the apparatus of measuring the backward light shown in FIG. 8, the backward light adjusting means 420 adjusts the arrangements of the isolator 33 and the collimator 32 so as to set the power of the reference light propagating in the isolator 33 in the reverse direction to be equal to or lower than the benchmark power, in accordance with an instruction from the measurement controller 43B.

Figure 9:
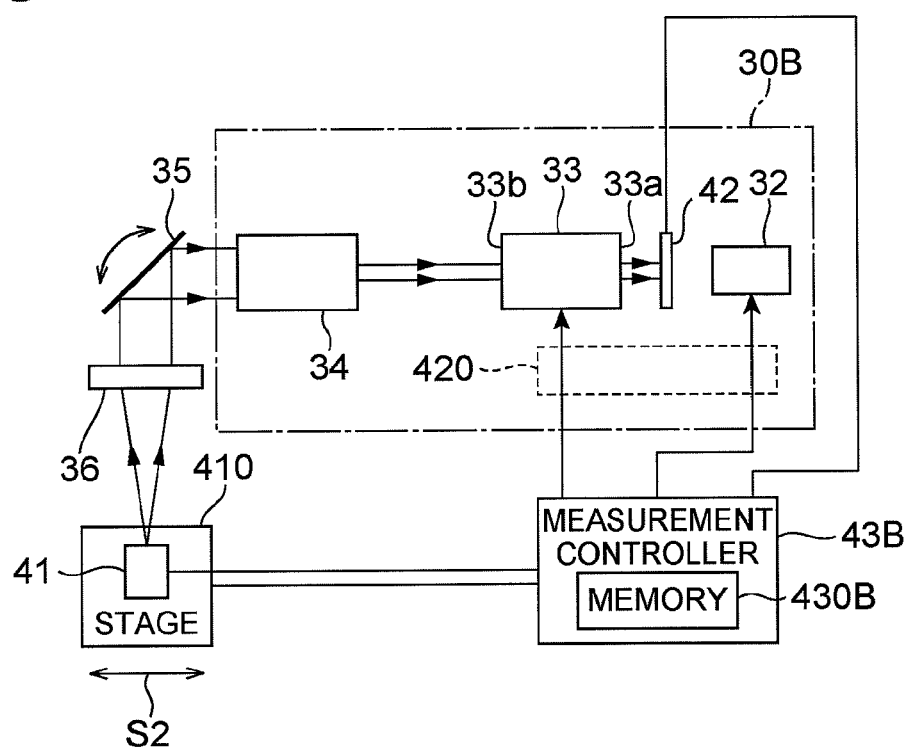
FIG. 9 is a diagram for explaining the second embodiment of the method of measuring backward light according to the present invention.

FIG. 9 is a diagram for explaining the second embodiment of the method of measuring backward light according to the present invention. In FIG. 9, the reference light is emitted from the measurement light source 41. The photodetector 42 detects, from the reference light, an optical component that reaches via the light collecting optical system 36, irradiation optical system 35, beam expander 34, and isolator 33. In accordance with the method of measuring backward light of the second embodiment, a laser is radiated in the focal position where the measurement light source 41 is disposed, on the basis of the intensity of the reference light detected by the photodetector 42 and the position of the measurement light source 41, thereby determining whether this backward light is likely to damage the laser light source part 10.

However, in the laser processing apparatus 2 shown in FIG. 7, since the measurement controller 43B has determined the risk that the laser light source part 10 is damaged by the backward light, the process controller 43A functions to move the arrangements of the collimator 32 and the isolator 33 in a direction parallel to the direction of travel of the laser beam outputted from the laser light source part 10, for the purpose of reducing the risk of damaging the laser light source part 10. Specifically, a part of the optical head 300 of the laser processing apparatus 2 is constituted by the backward light adjusting means 420 that is capable of changing the position of the isolator 33 and thereby outputting the reference light outputted from a first end 33a of the isolator 33, in a direction different from the one obtained before the change. In addition, out of the reference light outputted from the first end 33a of the isolator 33, the focal position of light entering the collimator 32 can also be changed by changing the arrangement of the collimator 32. Therefore, because the amount of light entering the light guide 20 can be reduced by the configuration of the laser processing apparatus 2 shown in FIG. 7, the risk of damaging the laser light source part 10 can be reduced.

The function of the measurement controller 43B is explained in further detail. First, in the method of measuring backward light according to the second embodiment, the emission position of the measurement light source 41 in relation to the irradiation optical system 35 is changed while controlling the stage 410, whereby powers of reference light are sequentially detected by the photodetector 42, and the detected light power for each emitting position of the reference light is recorded in the memory 430B. This measurement result is compared with a previously-set benchmark power to determine whether each detected light power is higher or lower than the benchmark power. This determination may be made by a human or performed automatically after causing the measurement controller 43B to store the benchmark power in the memory 430B. When the power of the detected light power is higher than the benchmark power, the arrangements of the collimator 32 and the isolator 33 included in the emitting optical system 30B are changed using the backward light adjusting means 420, and thereafter the arrangements of the measurement light source 41 and the irradiation optical system 35 are measured again under the same conditions. When the power of the optical component detected by the photodetector 42 after the change of the arrangements is lower than the benchmark power, this setting is saved. When the power of the detected light is higher than the benchmark power, the arrangements of the collimator 32 and the isolator 33 are changed again, and the above-described procedure is repeated. In this manner, the measurement controller 43B obtains the arrangement of the collimator 32 and the arrangement of the isolator 33 such that the power of the reference light at each emitting position of the reference light becomes equal to or lower than the benchmark power, and records the arrangement information for each emitting position of the reference light in the memory 430B.

In accordance with the laser processing method of the second embodiment, when performing laser processing using the laser beam outputted from the laser light source part 10, the arrangement of each optical component of the emitting optical system 30B is changed to perform the laser processing, on the basis of the measurement result obtained by the method of measuring backward light (FIG. 9) by means of the apparatus of measuring backward light shown in FIG. 8. Note that the arrangement of each optical component for each emitting position of the reference light is recorded in the memory 430A of the process controller 43A, similar to the memory 430B. Therefore, the laser beam from the laser processing apparatus 2 shown in FIG. 7 may be radiated onto the laser irradiation range of the object 50, while using the information recorded in the memory 430A to recreate the arrangements of the optical components of the optical head 300 that are recorded for the respective emitting positions of the reference light.

As described above, in the second embodiment, the arrangements of the collimator 32 and the isolator 33 included in the emitting optical system 30B are changed based on the measurement result of the backward light measured using the reference light emitted from the measurement light source 41. As a result, the backward light can be prevented from being inputted into the light guide 20, and thus the damage of the laser light source part 10.

Third Embodiment

Figure 10:
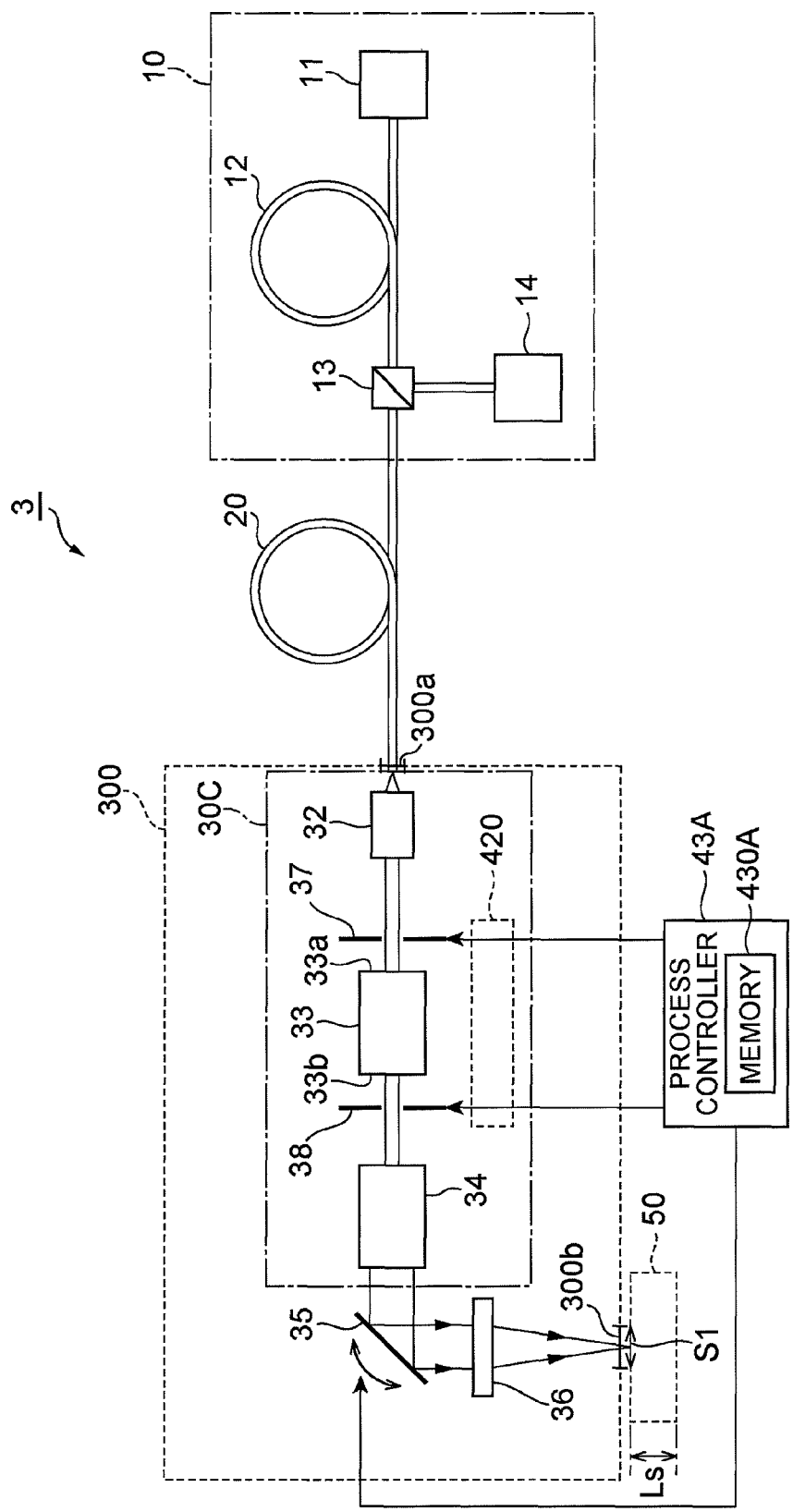
FIG. 10 is a diagram showing a configuration of a laser processing apparatus which realizes a laser processing method according to a third embodiment and to which an optical head evaluated by a method and apparatus of measuring backward light according to the third embodiment is applied.

FIG. 10 is a diagram showing a configuration of a laser processing apparatus which realizes a laser processing method according to a third embodiment and to which an optical head evaluated by a method and apparatus of measuring backward light according to the third embodiment is applied.

A laser processing apparatus 3 shown in FIG. 10 has a laser light source part 10, light guide 20, and optical head 300. The optical head 300 has a light incident end 300a for capturing a laser beam from the light guide 20, and a light emission end 300b for radiating the laser beam on an object 50. The optical head 300 further has an emitting optical system 30C, irradiation optical system (galvanometer mirror) 35, and light collecting optical system (fθ lens) 36. The light collecting optical system 36 is a combination of a plurality of lenses and configured as a black box because the lenses are various in shape and characteristics, depending on the application. The fθ lens used in the laser processing apparatus 2 is characterized in radiating the laser beam from the irradiation optical system 35 on the object 50 substantially vertically. Note that the laser processing apparatus 3 has a process controller 43A. The process controller 43A adjusts the angle of the irradiation optical system 35, thereby changing a laser irradiation position of the object 50 along the arrow S1. The process controller 43 may constitutes a part of the backward light measurement apparatus of the third embodiment, and has a memory 430A for recording an evaluation result and the like of the backward light measurement apparatus of the third embodiment.

Figure 11:
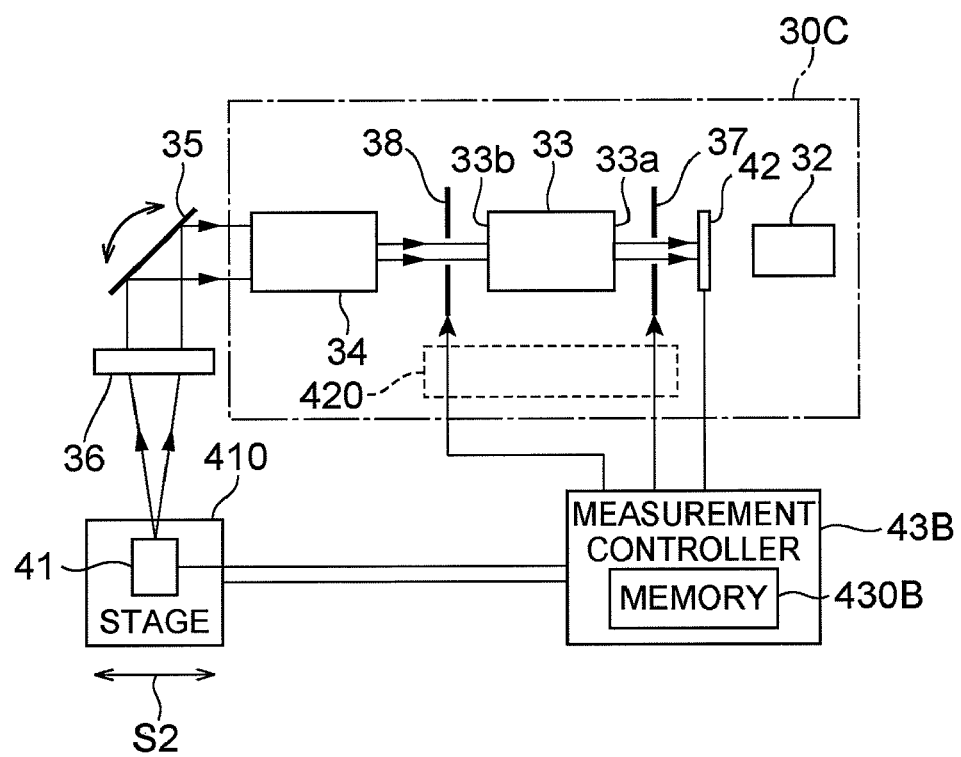
FIG. 11 is a diagram for explaining the third embodiment of the method of measuring backward light according to the present invention.

The backward light measurement apparatus of the third embodiment for realizing the method of measuring backward light according to the third embodiment has the same structure as the backward light measurement apparatus of the second embodiment shown in FIG. 8. Specifically, the backward light measurement apparatus of the third embodiment has a measurement light source 41, drive means (stage) 410 for moving the measurement light source 41 along the arrow S2, relative to the light emission end 300b of the optical head 300, photodetector 42, the measurement controller 43B having the memory 430B, and backward light adjusting means 420. As with the first embodiment and the second embodiment, the emitting optical system 30C of the third embodiment has a collimator 32, isolator 33, beam expander 34, irradiation optical system 35 and light collecting optical system 36. In the third embodiment, the emitting optical system 30C has a first restricting member 37 and second restricting member 38 for restricting a region into which a laser beam emitted from the laser light source part 10 is dropped. The backward light adjusting means 420 functions to adjust the first restricting member 37 and second restricting member 38 in accordance with an instruction from the measurement controller 43B. FIG. 11 is a diagram for explaining the third embodiment of the method of measuring backward light according to the present invention.

The first restricting member 37 is provided between the optical detector 42 and the isolator 33. The second restricting member 38 is provided between the isolator 33 and the beam expander 34. Each of the first and second restricting members 37 and 38 has a window around an optical axis of the laser beam reaching the emitting optical system 30C from the laser light source part 10. Although the size of the window of each of the first and second restricting members 37 and 38 is variable, it is approximately twice the mode field diameter of the laser beam collimated by the collimator 32. In addition, the positions of the first and second restricting members 37 and 38 can be moved in a direction parallel to the optical axis. The backward light adjusting means 420 changes the size of the window of each of the first and second optical components 37 and 38 and the position of the same in accordance with an instruction from the measurement controller 43B.

In the emitting optical system 30C, the first and second restricting members 37 and 38 allow the passage of only a forward beam, which is the laser beam reaching the emitting optical system 30C from the laser light source part 10 via the light guide 20. On the other hand, the first and second restricting members 37 and 38 are provided for the purpose of blocking backward light which moves in a reverse direction (backward beam) and of which a traveling direction has an angle different from that of the optical axis of the forward beam. In other words, of the backward light, backward light that cannot pass through one of the windows of the first and second restricting members 37 and 38 is blocked. For this reason, the backward light cannot reach the light guide 20 and thus does not damage the laser light source part 10.

As shown in FIG. 11, in the apparatus of measuring backward light according to the third embodiment, the reference light is emitted from the measurement light source 41. The photodetector 42 detects, from the reference light, an optical component that reaches via the light collecting optical system 36, irradiation optical system 35, beam expander 34, and isolator 33. The method of measuring backward light of the third embodiment is same as those of the first and second embodiments. However, in the laser processing apparatus 3 shown in FIG. 10, the backward light adjusting means 420 is provided within the optical head 300. Since the measurement controller 43B has determined the risk that the laser light source part 10 is damaged by the backward light, the process controller 43A instructs the backward light adjusting means 420 to move the arrangements of the first and second restricting members 37 and 38 and to change the size of the window of each of the first and second restricting members 37 and 38, for the purpose of reducing the risk of damaging the laser light source part 10. The backward light adjusting means 420 adjusts the arrangements and the like of the first and second restricting members 37 and 38 in accordance with an instruction from the process controller 43A as described above, whereby the amount of backward light reaching the light guide 20 can be reduced (the risk of damaging the laser light source part 10 can be reduced).

In the laser processing method according to the third embodiment, when the laser processing apparatus 3 shown in FIG. 10 performs laser processing using the information recorded in the memory 430A, the arrangements of the optical components within the optical head 300 may be changed sequentially. In addition, the backward light adjusting means 420 may adjust the arrangements of the optical components such that the power of the reference light from each emitting position of the reference light becomes equal to or lower than the benchmark power in advance.

As described above, according to the third embodiment, the positions of the first and second restricting members 37 and 38 of the emitting optical system 30C and the size of the window of each of the first and second restricting members 37 and 38 are changed based on the measurement result of the backward light that is measured while changing the emission position of the measurement light source 41. In such a configuration, the backward light can be prevented from being inputted into the light guide 20, and thus the damage of the laser light source part 10.

The above has described the embodiments of the present invention, but the present invention is not limited to the above embodiments and can be modified in a various ways. For example, in the laser processing apparatus 3 of the third embodiment, although the process controller 43A functions to change the position and window size of each of the first and second optical components 37 and 38, it may function to change the positions of the collimator 32 and the isolator 33, as with the laser processing apparatus 2 of the second embodiment.

In accordance with the present invention, because the backward light that passes through the isolator in the reverse direction can be checked and reduced prior to laser processing, the adverse effect of damaging the components of the laser processing apparatus can be avoided effectively.

What is claimed is:

1. A method of measuring backward light, in an optical head that configures a laser processing apparatus, together with a light source part emitting a processing laser beam, that has a light incident end for capturing the laser beam from the light source part and an light emission end for outputting the captured laser beam toward an object to be processed, and that is provided with an isolator disposed on an optical path of the laser beam propagating from the light incident end to the light emission end, the method measuring the power of backward light passing through the isolator from the light emission end toward the light incident end, in an direction opposite to a propagation direction of the laser beam, and comprising the steps of:

disposing a measurement light source for emitting light of large numerical aperture on the light emission end side of the optical head;

emitting reference light from the measurement light source into the optical head via the light emission end of the optical head, while changing an emission position of the measurement light source serving as an emitting position of the reference light, relative to the light emission end of the optical head;

measuring a power of the reference light passing through the isolator, for each emitting position of the reference light; and comparing the obtained reference light power with a previously-set base power for each emitting position of the reference light.

2. A method of measuring backward light according to claim 1, wherein, when one of the powers of the reference light obtained at the emitting positions of the reference light is greater than the base power, arrangement of at least one of a plurality of optical components including the isolator is adjusted so as to reduce the powers of the reference light to be obtained at all emitting positions of the reference light, to the base power or lower, the plurality of optical components being disposed on a propagation path of the laser beam emitted from the light source part to propagate from the light incident end to the light emission end.

3. A method of measuring backward light according to claim 1, further comprising the steps of:
performing a backward light adjusting operation for each emitting position of the reference light, in which, when the obtained reference light power is higher than the base power, arrangement of at least one of a plurality of optical components including the isolator is adjusted so as to set the reference light power in the vicinity of the base power, the plurality of optical components being disposed on a propagation path of the laser beam emitted from the light source part to propagate from the light incident end to the light emission end; and
recording the arrangement of each of the optical components for each emitting position of the reference light after the backward light adjusting operation is performed for each emitting position of the reference light.

4. A method of measuring backward light according to claim 2, wherein the optical components include the isolator and a collimator disposed between the isolator and the light incident end of the optical head, and
wherein arrangement of at least one of the isolator and the collimator is adjusted.

5. A method of measuring backward light according to claim 2, wherein the optical components further include a restricting member, disposed at least either between the isolator and the collimator or between the isolator and the light emission end of the optical head, for restricting a laser beam transmission region, and
wherein arrangement of at least one of the isolator, the collimator, and the restricting member is adjusted.

6. A method of measuring backward light according to claim 3, wherein the optical components include the isolator and a collimator disposed between the isolator and the light incident end of the optical head, and
wherein arrangement of at least one of the isolator and the collimator is adjusted.

7. A method of measuring backward light according to claim 3, wherein the optical components further include a restricting member, disposed at least either between the isolator and the collimator or between the isolator and the light emission end of the optical head, for restricting a laser beam transmission region, and
wherein arrangement of at least one of the isolator, the collimator, and the restricting member is adjusted.

8. A method of measuring backward light according to claim 1, wherein the optical head has: an emitting optical system disposed between the light incident end and the light emission end and having the isolator; an irradiation optical system, disposed between the emitting optical system and the light emission end, for radiating a laser beam emitted from the emitting optical system onto the object to be processed; and an fθ lens disposed between the irradiation optical system and the light emission end, and
wherein the measurement light source emits the reference light toward the fθ lens via the light emission end of the optical head, with a predetermined angle in relation to an optical axis of the fθ lens.

9. A laser processing method, comprising the steps of:
preparing a laser processing apparatus which has the optical head in which the power of the reference light from each emitting position of the reference light contained in a laser irradiation range of an object to be processed is measured by a method of measuring backward light according to claim 1, and records the results of comparison between the measured power of the reference light and the base power, for each emitting position of the reference light; and
radiating a laser beam from the prepared laser processing apparatus onto the laser irradiation range of the object to be processed, while sequentially avoiding the emitting positions of the reference light at which the measured power of the reference light exceeds the benchmark power.

10. A laser processing method, comprising the steps of:
preparing a laser processing apparatus which has the optical head in which arrangement of at least one of the plurality of optical components is adjusted on the basis of the results of measurement of the power of the reference light from each emitting position of the reference light contained in a laser irradiation range of an object to be processed, the results of measurement being obtained by a method of measuring backward light according to claim 2; and
radiating a laser beam from the prepared laser processing apparatus onto the laser irradiation range of the object to be processed.

11. A laser processing method, comprising the steps of:
preparing a laser processing apparatus which has the optical head in which the power of the reference light from each emitting position of the reference light contained in a laser irradiation range of an object to be processed is measured by a method of measuring backward light according to claim 3; and
radiating a laser beam from the prepared laser processing apparatus onto the laser irradiation range of the object to be processed, while the arrangement of the optical components contained in the optical head is recreated, the arrangement being recorded for each emitting position of the reference light.

12. An apparatus of measuring backward light, in an optical head that configures a laser processing apparatus, together with a light source part emitting a processing laser beam, that has a light incident end for capturing the laser beam from the light source part and an light emission end for outputting the captured laser beam toward an object to be processed, and that is provided with an isolator disposed on an optical path of the laser beam propagating from the light incident end to the light emission end, the apparatus measuring the power of backward light passing through the isolator from the light emission end toward the light incident end, in a direction opposite to a propagation direction of the laser beam, and comprising:
a measurement light source, disposed on the light emission end side of the optical head, for emitting light of large numerical aperture;
drive means for moving the measurement light source so as to change an emission position of the measurement light source serving as an emitting position of the reference light, relative to the light emission end of the optical head;

a photodetector for measuring a power of reference light emitted from the measurement light source and passing through the isolator in a direction opposite to a propagation direction of the laser beam emitted from the light source part; and a controller that has a memory for sequentially recording results of comparison between the obtained reference light power and a previously-set benchmark power, for each emitting position of the reference light.

13. An apparatus of measuring backward light according to claim 12, further comprising backward light adjusting means for adjusting arrangement of at least one of a plurality of optical components including the isolator, which are disposed on a propagation path of the laser beam emitted from the light source part to propagate from the light incident end to the light emission end, wherein the controller controls the backward light adjusting means to reduce the powers of the reference light to be obtained at all emitting positions of the reference light, to the benchmark power or lower, when one of the powers of the reference light obtained at the emitting positions of the reference light is greater than the benchmark power.

14. An apparatus of measuring backward light according to claim 12, further comprising backward light adjusting means for adjusting arrangement of at least one of a plurality of optical components including the isolator, which are disposed on a propagation path of the laser beam emitted from the light source part and propagating from the light incident end to the light emission end, wherein the controller performs a backward light adjusting operation for each emitting position of the reference light, to control the backward light adjusting means such that, when the obtained reference light power is higher than the benchmark power, the reference light power is set in the vicinity of the benchmark power, and wherein the arrangement of each of the optical components is recorded in the memory for each emitting position of the reference light after the backward light adjusting operation is performed for each emitting position of the reference light.

15. An apparatus of measuring backward light according to claim 13, wherein the optical components include the isolator and a collimator disposed between the isolator and the light incident end of the optical head, and wherein the backward light adjusting means adjusts arrangement of at least one of the isolator and the collimator.

16. An apparatus of measuring backward light according to claim 13, wherein the optical components further include a restricting member, disposed at least either between the isolator and the collimator or between the isolator and the light emission end of the optical head, for restricting a laser beam transmission region, and wherein the backward light adjusting means adjusts arrangement of at least one of the isolator, the collimator, and the restricting member.

17. An apparatus of measuring backward light according to claim 14, wherein the optical components include the isolator and a collimator disposed between the isolator and the light incident end of the optical head, and wherein the backward light adjusting means adjusts arrangement of at least one of the isolator and the collimator.

18. An apparatus of measuring backward light according to claim 14, wherein the optical components further include a restricting member, disposed at least either between the isolator and the collimator or between the isolator and the light emission end of the optical head, for restricting a laser beam transmission region, and wherein the backward light adjusting means adjusts arrangement of at least one of the isolator, the collimator, and the restricting member.

19. An apparatus of measuring backward light according to claim 12, wherein the optical head has: an emitting optical system disposed between the light incident end and the light emission end and having the isolator; an irradiation optical system, disposed between the emitting optical system and the light emission end, for radiating a laser beam emitted from the emitting optical system onto the object to be processed; and an fθ lens disposed between the irradiation optical system and the light emission end, and wherein the measurement light source emits the reference light toward the fθ lens via the light emission end of the optical head, with a predetermined angle in relation to an optical axis of the fθ lens.

* * * * *